United States Patent
Sahara

(10) Patent No.: US 8,275,405 B2
(45) Date of Patent: Sep. 25, 2012

(54) MOBILE COMMUNICATION SYSTEM, BASE STATION APPARATUS, MOBILE STATION APPARATUS, TRANSMISSION POWER CONTROL METHOD AND INFORMATION RECORDING MEDIUM

(75) Inventor: Tooru Sahara, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 855 days.

(21) Appl. No.: 12/067,933

(22) PCT Filed: Sep. 5, 2006

(86) PCT No.: PCT/JP2006/317573
§ 371 (c)(1),
(2), (4) Date: Feb. 24, 2009

(87) PCT Pub. No.: WO2007/037102
PCT Pub. Date: Apr. 5, 2007

(65) Prior Publication Data
US 2009/0247210 A1   Oct. 1, 2009

(30) Foreign Application Priority Data
Sep. 29, 2005  (JP) .................................. 2005-285534

(51) Int. Cl.
*H04B 7/00*  (2006.01)
(52) U.S. Cl. ........ 455/522; 455/69; 455/67.11; 370/318
(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| | | | | |
|---|---|---|---|---|
| 6,963,754 | B2 * | 11/2005 | Masuda et al. | 455/522 |
| 7,372,889 | B2 * | 5/2008 | Atarashi et al. | 375/130 |
| 2001/0046876 | A1 * | 11/2001 | Voyer | 455/522 |
| 2002/0071408 | A1 * | 6/2002 | Ogawa et al. | 370/335 |
| 2002/0098838 | A1 * | 7/2002 | Ikeda et al. | 455/423 |

(Continued)

FOREIGN PATENT DOCUMENTS

JP       2003244070        8/2003

(Continued)

OTHER PUBLICATIONS

International Search Report for PCT/JP2006/317573, mailed on Dec. 5, 2006, 1 page.

*Primary Examiner* — Dominic E Rego
(74) *Attorney, Agent, or Firm* — Duane Morris, LLP; Richard C. Kim

(57) ABSTRACT

In a mobile communication system performing the space division multiplex, the wireless resources are saved as much as possible and the reception powers of communication signals, which are received by a base station apparatus from mobile station apparatuses, are evened. A mobile communication system wherein each of mobile station apparatuses (10) includes a maximum power transmission information transmitting part (13) that transmits, to a base station apparatus (20), maximum power transmission information indicating that a communication signal is transmitted at the maximum transmission power of that mobile station apparatus (10), while the base station apparatus (20) includes a reception power acquiring part (22) that acquires the reception powers of the communication signals transmitted from the respective mobile station apparatuses (10), a maximum power transmission.

5 Claims, 5 Drawing Sheets

1: MOBILE COMMUNICATION SYSTEM

U.S. PATENT DOCUMENTS

| | | |
|---|---|---|
| 2003/0031145 A1* | 2/2003 | Zeira et al. .................... 370/335 |
| 2003/0133409 A1* | 7/2003 | Corazza ....................... 370/230 |
| 2003/0189907 A1* | 10/2003 | Miyamoto et al. ............ 370/320 |
| 2004/0127225 A1* | 7/2004 | Qiu et al. ....................... 455/450 |
| 2004/0131029 A1* | 7/2004 | Tobe et al. .................... 370/331 |
| 2004/0229603 A1* | 11/2004 | Sato et al. .................. 455/422.1 |
| 2005/0079886 A1* | 4/2005 | Niwano ........................ 455/522 |
| 2005/0221871 A1* | 10/2005 | Kim ............................... 455/574 |
| 2006/0003760 A1* | 1/2006 | Li et al. ......................... 455/424 |
| 2006/0286994 A1* | 12/2006 | Kwak et al. ................... 455/522 |
| 2007/0161408 A1* | 7/2007 | Hashigami et al. ......... 455/562.1 |
| 2007/0243894 A1* | 10/2007 | Das et al. ...................... 455/522 |
| 2007/0268851 A1* | 11/2007 | Terabe .......................... 370/320 |
| 2008/0039066 A1* | 2/2008 | Laroia et al. ............... 455/422.1 |
| 2011/0064044 A1* | 3/2011 | Ofuji et al. .................... 370/330 |

FOREIGN PATENT DOCUMENTS

| | | |
|---|---|---|
| JP | 2004297567 | 10/2004 |
| JP | 2005006089 | 1/2005 |
| JP | 2005217783 | 8/2005 |

* cited by examiner

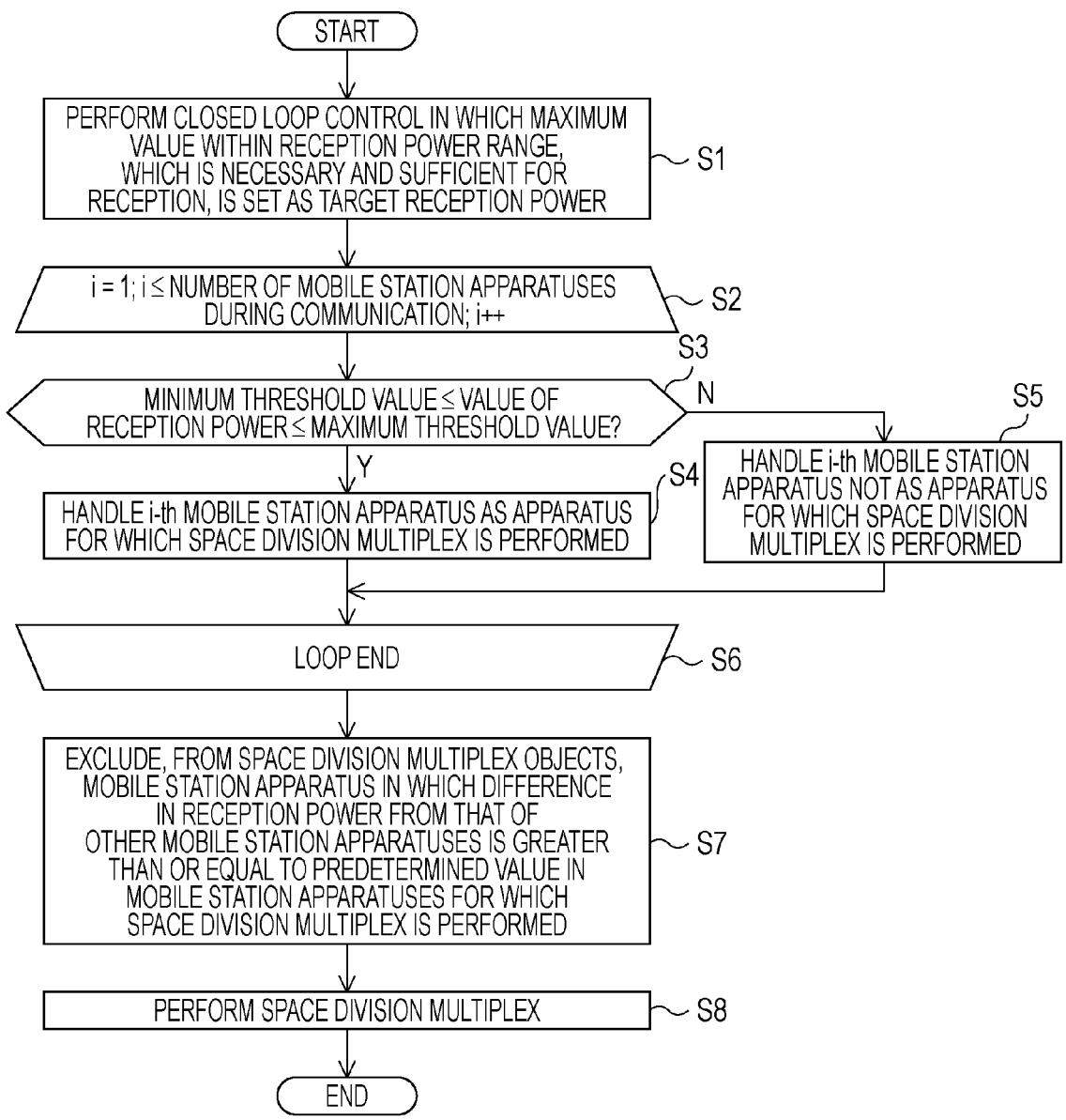

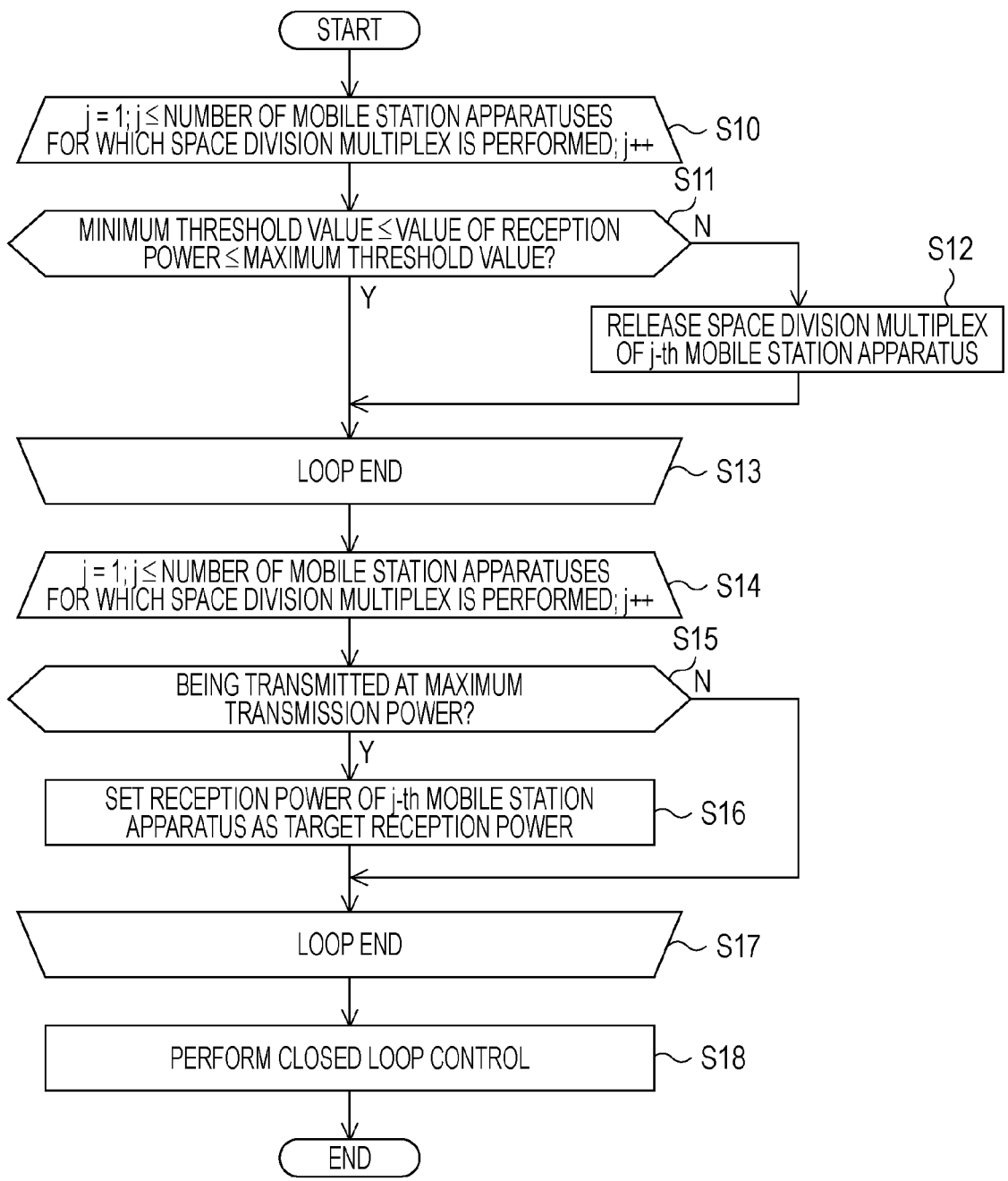

MOBILE COMMUNICATION SYSTEM, BASE STATION APPARATUS, MOBILE STATION APPARATUS, TRANSMISSION POWER CONTROL METHOD AND INFORMATION RECORDING MEDIUM

TECHNICAL FIELD

The present invention relates to a mobile communication system, a base station apparatus, a mobile station apparatus, a transmission power control method, and an information recording medium.

BACKGROUND ART

In a mobile communication system in which space division multiplex communication is performed, the reception powers of signals received from a plurality of space-division multiplexed mobile station apparatuses by a base station apparatus need to be equalized to some extent. In order to realize this, in the related art, a remaining power value of transmission power (a value obtained by subtracting the present transmission power from the maximum transmission power) is transmitted from a mobile station apparatus to a base station apparatus. The base station apparatus performs processing described below on the basis of the remaining power value received from each mobile station apparatus so that the reception powers are equalized.

More specifically, on the basis of the remaining power value received from each mobile station apparatus, first, the base station apparatus selects a mobile station apparatus having the smallest reception power when transmission is performed at the maximum possible transmission power. The mobile station apparatus is usually a mobile station apparatus (mobile station apparatus in which the path of radio waves is longest) at a position farthest from the base station apparatus among the mobile station apparatuses and therefore, will be hereinafter referred to as the "farthest mobile station apparatus". Next, the base station apparatus maximizes the transmission power of the farthest mobile station apparatus. Finally, the base station apparatus adjusts the transmission powers of the mobile station apparatuses other than the farthest mobile station apparatus so that the reception powers of the signals received from the mobile station apparatuses other than the farthest mobile station apparatus are equalized.

Japanese Unexamined Patent Application Publication No. 2005-6089 discloses a technology related to determination of transmission power of a base station apparatus in accordance with a modulation method used for communication by mobile station apparatuses during space division multiplex communication.

DISCLOSURE OF INVENTION

Problems to be Solved by the Invention

However, in the above-described related art, in order to equalize reception powers, it is necessary for the mobile station apparatus to transmit a remaining power value. Since this remaining power value is a specific power value, many wireless resources are used for transmission.

In contrast, for example, the number of effective digits of the remaining power value may be reduced. The smaller the number of effective digits of the remaining power value, the smaller the amount of wireless resources used, however, variations in the reception power become larger.

Accordingly, one of the objects of the present invention is to provide a mobile communication system capable of equalizing reception powers of communication signals received from mobile station apparatuses by a base station apparatus while saving wireless resources as much as possible in the mobile station apparatus by which space division multiplex is performed, a base station apparatus, a mobile station apparatus, a transmission power control method, and an information recording medium.

Means for Solving the Problems

In order to solve the above-described problems, a mobile communication system according to the present invention comprises a base station apparatus and a plurality of mobile station apparatuses. The mobile communication system performs the space division multiplex between the base station apparatus and at least a part of the plurality of mobile station apparatuses. In the mobile communication system, the base station apparatus comprises a transmission power control unit which controls transmitting power of each of the mobile station apparatuses such that a reception power of a communication signal transmitted from each of the mobile station apparatuses is equal to the predetermined reception power. Each of the mobile station apparatuses comprises a maximum power transmission information transmitting unit which transmits, to a base station apparatus, maximum power transmission information indicating that a communication signal is transmitted at the maximum transmission power of the mobile station apparatus. The base station apparatus further comprises a reception power acquiring unit which acquires the reception power of the communication signal transmitted from each of the mobile station apparatuses, a maximum power transmission information receiver which receives the maximum power transmission information from each of the mobile station apparatuses and a target reception power changer which changes a target reception power, based on the reception powers acquired by the reception power acquiring unit and related to the mobile station apparatus which has transmitted the maximum power transmission information.

In the mobile communication system, first, the transmission power of each mobile station apparatus is controlled so that the reception power of the base station apparatus becomes a predetermined target reception power and therefore, the mobile station apparatus that transmits information indicating that maximum power is being transmitted becomes the farthest mobile station apparatus. Next, on the basis of the reception power of the communication signal transmitted from the farthest mobile station apparatus, the target reception power is changed. Therefore, in the mobile communication system in which space division multiplex is performed, it is possible to equalize the reception power of a communication signal received from each mobile station apparatus by the base station apparatus while saving wireless resources as much as possible.

In the foregoing mobile communication system, the reception power is acquired by the reception power acquiring unit and is related to the mobile station apparatuses transmitting the maximum power transmission information. The target reception power changer may change the reception power to the target reception power.

In addition, in each of the above-described mobile communication system, the transmission power control unit controls the transmitting power of each of the mobile station apparatuses such that the reception power of a communication signal transmitted from each mobile station apparatus falls in a predetermined target reception power, so as to perform the space division multiplex between the base station apparatus and the mobile station apparatuses of which the reception power falls in a predetermined receiving power range.

Furthermore, a base station apparatus according to the present invention is used in a mobile communication system. The mobile communication system includes a plurality of mobile station apparatuses and a base station. The mobile communication system also performs the space division multiplex between a base station apparatus and at least a part of the mobile station apparatuses. The base station apparatus comprises a transmission power control unit controlling transmitting power of each of the mobile station apparatuses such that a reception power of a communication signal transmitted from each of the mobile station apparatuses is equal to the predetermined reception power. The base station apparatus further comprises a reception power acquiring unit which acquires the reception power of the communication signal transmitted from each of the mobile station apparatuses, a maximum power transmission information receiver which receives the maximum power transmission information from each of the mobile station apparatuses and a target reception power changer which changes a target reception power, based on the reception powers acquired by the reception power acquiring unit and related to the mobile station apparatus which has transmitted the maximum power transmission information.

A mobile station apparatus according to the present invention transmits, to a base station apparatus, maximum power transmission information indicating that a communication signal is transmitted at the maximum transmission power of the mobile station apparatus.

A transmission power control method according to the present invention, in a communication system which comprises a base station apparatus and a plurality of mobile station apparatuses and performs the space division multiplex between the base station apparatus and at least a part of the mobile station apparatuses, controls transmitting power of each of the mobile station apparatuses. In the mobile communication system, the base station apparatus comprises a transmission power control unit which controls transmitting power of each of the mobile station apparatuses such that a reception power of a communication signal transmitted from each of the mobile station apparatuses is equal to a predetermined reception power. The method comprises a reception acquiring step and a target reception power changing step. In the reception acquiring step, the reception power of the base station apparatus for the communication signal transmitted from each of the mobile station apparatuses is acquired. In the target reception power changing step, the target reception power is changed, based on the reception power of the mobile station apparatus which is transmitting a communication signal at a maximum transmitting power. The reception power is acquired by the reception power acquiring unit.

A program according to the present invention is used in a communication system which comprises a base station apparatus and a plurality of mobile station apparatuses and which performs the space division multiplex between the base station apparatus and at least a part of a plurality of mobile station apparatuses. The program functions the base station apparatus. In the mobile communication system, the base station comprises a transmission power control unit controlling transmitting power of each of the mobile station apparatuses such that reception power of a communication signal transmitted from each of the mobile station apparatuses is equal to a predetermined reception power. The program functions a reception power acquiring unit which acquires the reception power of the communication signal transmitted from each of the mobile station apparatuses, a maximum power transmission information receiver which receives the maximum power transmission information from each of the mobile station apparatuses and a target reception power changer which changes a target reception power, based on the reception powers acquired by the reception power acquiring unit and related to the mobile station apparatuses which have transmitted the maximum power transmission information.

The program may be recorded on a computer-readable information recording medium. Examples of the information recording media that can be used include a magnetic tape, a flexible disk, a hard disk, and an IC card.

BRIEF DESCRIPTION OF THE DRAWINGS

FIG. 4 is a flowchart of processing of a base station apparatus according to an embodiment of the present invention.

FIG. 5 is a flowchart of processing of a base station apparatus according to an embodiment of the present invention.

BEST MODE FOR CARRYING OUT THE INVENTION

An embodiment of the present invention will be described below with reference to the drawings.

Figure 1:
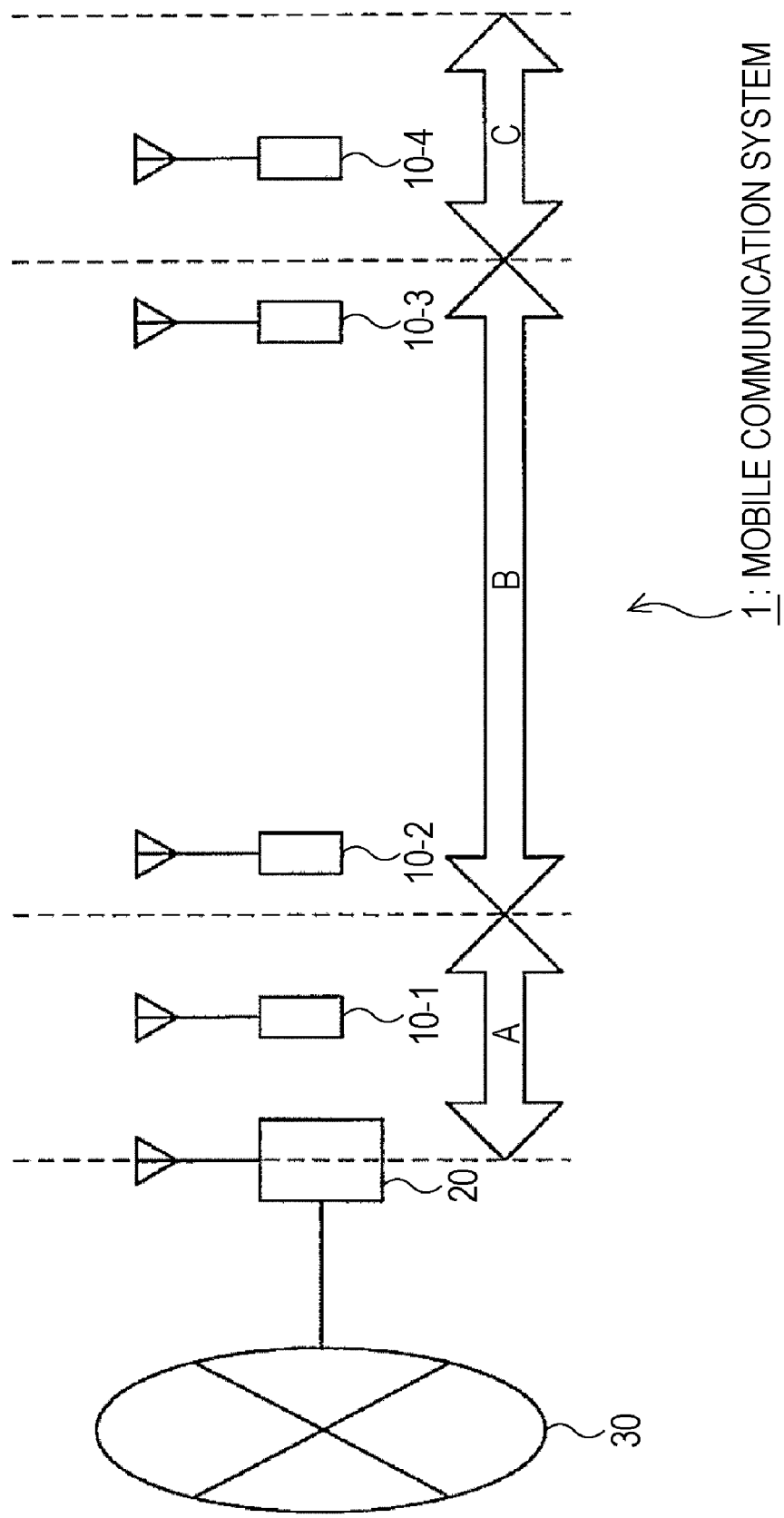
FIG. 1 is a system configuration diagram of a mobile communication system according to an embodiment of the present invention.

FIG. 1 shows the system configuration of a mobile communication system 1 according to an embodiment of the present invention.

As shown in FIG. 1, the mobile communication system 1 includes a plurality of mobile station apparatuses 10, a base station apparatus 20, and a communication network 30. Here, the mobile communication system 1 is a mobile communication system that uses a PHS method.

The mobile station apparatus 10 may be a computer including a CPU, a memory, and a communication interface.

The CPU controls each section of the mobile station apparatus 10 and performs processing related to communication, such as phone conversation and data communication.

The memory functions as a work memory for the CPU and also holds programs and parameters related to various kinds of processing performed by the CPU.

The communication interface includes an antenna, and performs processing for receiving a communication signal and a control signal transmitted from the base station apparatus 20 and outputting them to the CPU, and processing for sending a communication signal and a control signal as radio waves to a wireless communication section in accordance with instructions from the CPU.

The base station apparatus 20 may also be a computer including a CPU, a memory, and a communication interface.

The CPU controls each section of the base station apparatus 20 and performs processing related to communication, such as phone conversation and data communication.

The memory functions as a work memory for the CPU and also holds programs and parameters related to various kinds of processing performed by the CPU.

The base station apparatus 20 includes a wireless communication interface having an antenna and a wired interface as communication interfaces. The wireless communication interface performs processing for receiving a communication signal and a control signal transmitted from the mobile station apparatus 10 and outputting them to the CPU, and processing for sending a communication signal and a control signal as radio waves to a wireless communication section in accordance with instructions from the CPU. The wired interface performs processing for receiving a communication signal and a control signal transmitted from another computer included in the communication network 30 and outputting them to the CPU, and processing for sending a communication signal and a control signal to the communication network 30 in accordance with instructions from the CPU.

The wireless communication interface included in the base station apparatus 20 is able to perform space division multiplex. That is, the wireless communication interface includes a plurality of antennas, and controls the transmission power of radio waves transmitted from each antenna on the basis of the reception power of radio waves received by each antenna from the mobile station apparatus 10. Under this control, the base station apparatus 20 directs the orientation of transmission radio waves to a direction in which the mobile station apparatus 10 exists, thereby realizing space division multiplex.

The communication network 30 is an exchange network or a TCP/IP network. A plurality of computers (not shown) is connected to the communication network 30, and the communication network 30 relays communication among them.

The base station apparatus 20 performs communication with the mobile station apparatus 10 in a range in which radio waves to be sent from each other can be received. This range is generally called an area. In this embodiment, this area is further classified into an area A, an area B, and an area C in ascending order of the length of the path of radio waves. This example is shown in FIG. 1. In FIG. 1, a mobile station apparatus 10-1 is positioned in the area A, mobile station apparatuses 10-2 and 10-3 are positioned in the area B, and a mobile station apparatus 10-4 is positioned in the area C.

The mobile communication system 1 realizes that only the mobile station apparatus 10 positioned in the area B is made to be an object for space division multiplex (the mobile station apparatuses 10 positioned in the areas A and C are excluded from the object for space division multiplex).

It is also realized that, in the base station apparatus 20, the reception powers of radio waves transmitted from the plurality of mobile station apparatuses 10 positioned in the area B are equalized. The configuration for this purpose will be specifically described with reference to the function block diagrams of the mobile communication system 1.

Figure 2:
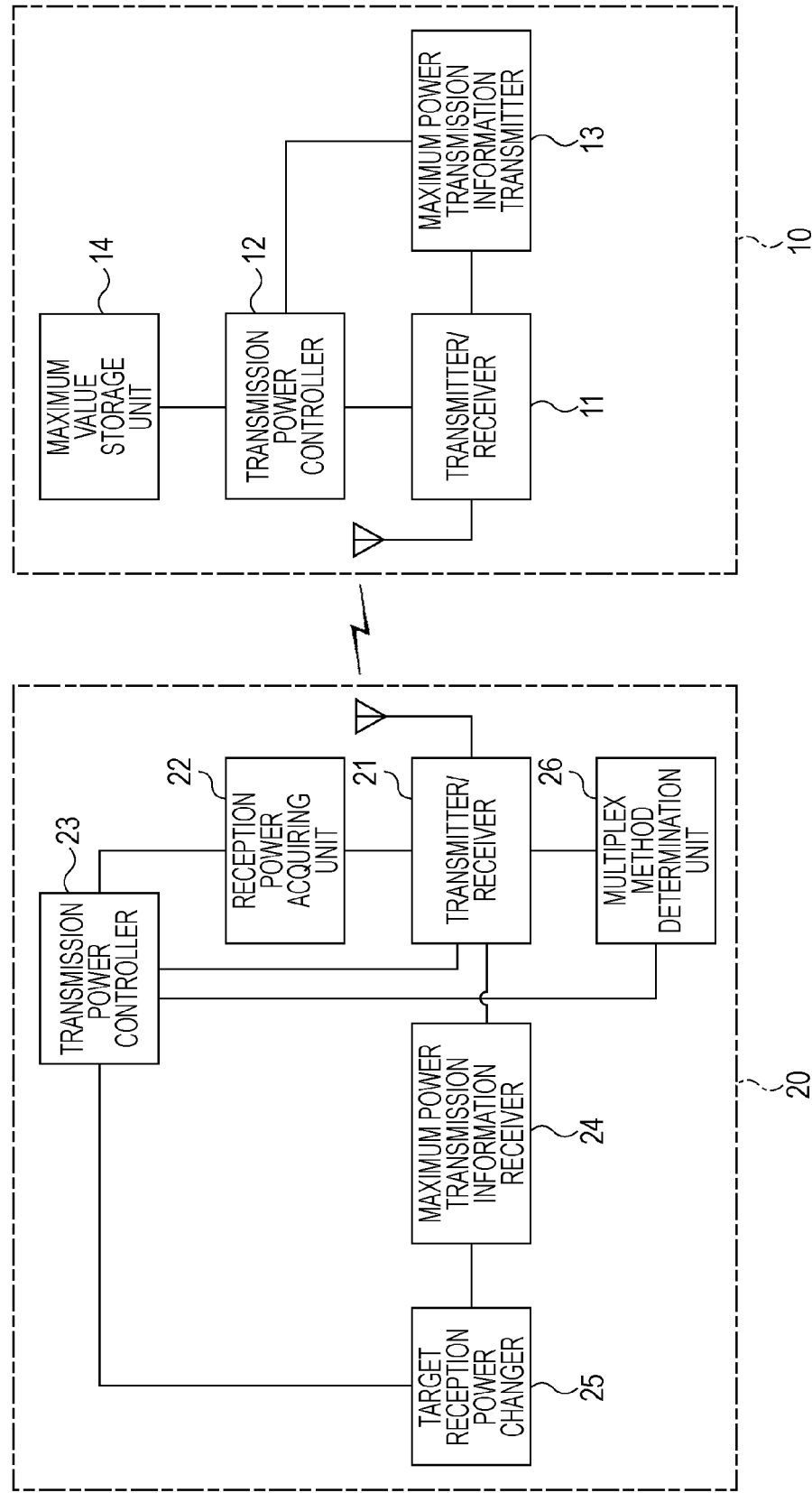
FIG. 2 is a function block diagram of the mobile communication system according to the embodiment of the present invention.

FIG. 2 is a function block diagram of the mobile communication system 1. As shown in FIG. 2, the mobile station apparatus 10 includes, in terms of functions, a transmitter/receiver 11, a transmission power controller 12, a maximum power transmission information transmitter 13, and a maximum value storage unit 14. The base station apparatus 20 includes, in terms of functions, a transmitter/receiver 21, a reception power acquiring unit 22, a transmission power controller 23, a maximum power transmission information receiver 24, and a target reception power changer 25.

The mobile station apparatus 10 will be described first.

The transmitter/receiver 11 transmits a communication signal as radio waves to a wireless communication section in accordance with instruction of a communication processor (not shown) and also receives radio waves from the wireless communication section and outputs them as a communication signal to the communication processor.

The transmission power controller 12 controls transmission power (hereinafter referred to as "transmission power" of the transmitter/receiver 11) when the transmitter/receiver 11 transmits radio waves to a wireless communication section. More specifically, the transmission power controller 12 controls transmission power under either open loop control or closed loop control. The range of power that can be controlled by the transmission power control is limited to a fixed range. That is, the transmission power controller 12 controls the transmission power of the transmitter/receiver 11 in the range between a predetermined minimum value and a maximum value determined as described later.

In open loop control, the transmission power controller 12 controls the transmission power of the transmitter/receiver 11 on the basis of the reception power (hereinafter referred to as "reception power of the transmitter/receiver 11") of radio waves sent from the base station apparatus 20 and received by the transmitter/receiver 11. More specifically, control is performed in such a manner that the smaller the reception power of the transmitter/receiver 11, the larger the transmission power of the transmitter/receiver 11 becomes. In open loop control, the transmission power controller 12 sets the maximum transmission power of the transmitter/receiver 11 as the maximum value.

In closed loop control, the transmission power controller 12 controls the transmission power of the transmitter/receiver 11 on the basis of the reception power of radio waves sent from the mobile station apparatus 10 and received by a transmitter/receiver 21 (to be described later) (hereinafter referred to as "reception power of the transmitter/receiver 21"). More specifically, the base station apparatus 20 instructs the mobile station apparatus 10 as to transmission power (details will be described later). The transmission power controller 12 controls the transmission power of the transmitter/receiver 11 in accordance with the instruction. More specifically, the transmission power controller 12 controls the transmission power of the transmitter/receiver 11 so as to become the instructed transmission power.

When the mobile station apparatus 10 starts to communicate with the base station apparatus 20, the transmission power controller 12 performs the above-described open loop control. The transmission power controller 12 determines the maximum value of the transmission power on the basis of the transmission power determined by the open loop control. This point will be described below.

The maximum value storage unit 14 has stored several transmission power maximum values in advance. The transmission power controller 12 determines, as the maximum value of the transmission power, the smallest of the transmission power maximum values in the range that is not below the transmission power determined by the open loop control. While the communication continues, the transmission power controller 12 controls the transmission power of the transmitter/receiver 11 in the range smaller than or equal to the maximum value determined herein under closed loop control.

Under the control of the transmission power controller 12, when the maximum power transmission information transmitter 13 is transmitting radio waves at the determined maximum value, the transmitter 13 causes maximum power transmission information indicating that a communication signal is being transmitted at the maximum transmission power of the mobile station apparatus 10 to be contained in a communication signal to be transmitted.

Figure 3:
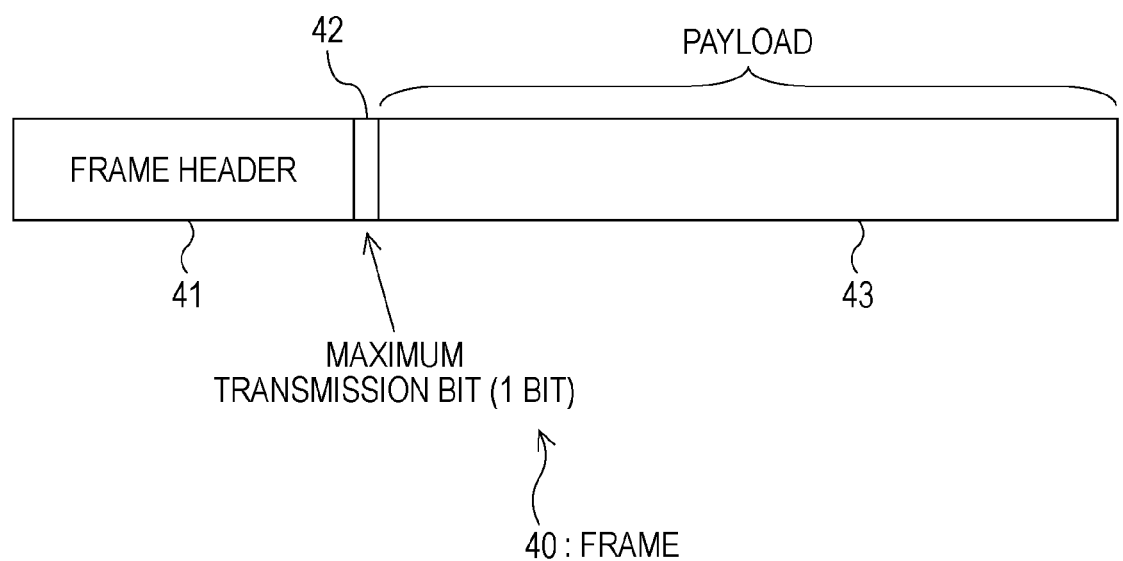
FIG. 3 shows the format of a transmission frame according to the embodiment of the present invention.

FIG. 3 shows an example of maximum power transmission information and also shows an example of a communication signal to be transmitted from the mobile station apparatus 10 to the base station apparatus 20. As shown in FIG. 3, the communication signal is made up of a frame header 41 containing control information for communication control, a maximum transmission bit 42 formed of 1-bit data, and a payload 43 containing communication content. The maximum power transmission information transmitter 13 transmits maximum power transmission information by using the maximum transmission bit 42. That is, the maximum power transmission information transmitter 13 transmits maximum power transmission information by setting the maximum transmission bit 42 to 1.

Next, the base station apparatus 20 will be described.

The transmitter/receiver 21 transmits a communication signal as radio waves to a wireless communication section in accordance with instructions of the communication processor (not shown), and receives radio waves from the wireless communication section and outputs them as a communication signal to the communication processor.

The reception power acquiring unit 22 acquires the reception power (the reception power of the transmitter/receiver 21) of radio waves transmitted from each mobile station apparatus 10, which have been received by the transmitter/receiver 21, and outputs it to the transmission power controller 23.

The transmission power controller 23 controls the transmission power of each mobile station apparatus 10 so that the reception power of the transmitter/receiver 21, which is input from the reception power acquiring unit 22, is set to be a predetermined target reception power. The transmission power controller 23 sets, as the target reception power, the maximum reception power in the range of the reception power, which is necessary and sufficient to demodulate radio waves received by the transmitter/receiver 21 when space division multiplex is performed. Regarding the mobile station apparatus 10 in which the reception power of the transmitter/receiver 21 is more than the target reception power, the transmission power controller 23 performs control so that the transmission power is lowered. On the other hand, regarding the mobile station apparatus 10 in which the reception power of the transmitter/receiver 21 is less than the target reception power, the transmission power controller 23 performs control so that the transmission power is increased.

A multiplex method determination unit 26 determines that space division multiplex communication is performed for the mobile station apparatus 10 in which the reception power is within the range of the reception power as a result of controlling the transmission power of each mobile station apparatus 10 so that the reception power of the transmitter/receiver 21 becomes a predetermined target reception power by the transmission power controller 23.

On the other hand, the multiplex method determination unit 26 excludes the mobile station apparatus 10 in which the reception power of the transmitter/receiver 21 is not in the range of the reception power from the object for space division multiplex communication. That is, as described above, since the range of the transmission power control of the transmission power controller 12 is limited, when the mobile station apparatus 10 is at a position far from the base station apparatus 20, even if the transmission power controller 12 performs control so that transmission is performed at the maximum transmission power, there is a case in which the reception power of the transmitter/receiver 21 is below the reception power range. Furthermore, when, conversely, the mobile station apparatus 10 is too near the base station apparatus 20, even if the transmission power controller 12 performs control so that transmission is performed at the minimum transmission power, there is a case in which the reception power of the transmitter/receiver 21 exceeds the reception power range. As a result, a mobile station apparatus 10 in which the reception power of the transmitter/receiver 21 is too small or too large occurs even under the control of the transmission power controller 23. That is, a mobile station apparatus 10 in which the limit of the transmission power control is reached occurs. The multiplex method determination unit 26 excludes a mobile station apparatus 10 in which the reception power of the transmitter/receiver 21 is too small or too large in this manner from the object for space division multiplex communication.

This will be described again with reference to FIG. 1. If the maximum value of the transmission power control range of the transmission power controller 12 is assumed to be the same, under the control of the multiplex method determination unit 26, only the mobile station apparatus 10 positioned in the area B is made to be an object for space division multiplex communication. The mobile station apparatuses 10 positioned in the areas A and C, as described above, has reached the limit of transmission power control, and there is no possibility that the reception power of the transmitter/receiver 21 is equalized. Therefore, the multiplex method determination unit 26 excludes those mobile station apparatuses 10 from the object for space division multiplex communication.

Next, the maximum power transmission information receiver 24 receives maximum power transmission information, which is transmitted from the mobile station apparatus 10 which has been made to be an object for space division multiplex communication by the multiplex method determination unit 26, within the maximum power transmission information which is transmitted from each mobile station apparatus 10, and outputs the information to the target reception power changer 25.

On the basis of the reception power regarding the mobile station apparatus 10 that has transmitted the maximum power transmission information which has been input from the maximum power transmission information receiver 24, the reception power being acquired by the reception power acquiring unit 22, the target reception power changer 25 changes the predetermined target reception power. More specifically, the target reception power changer 25 sets, as a predetermined target reception power, the reception power regarding the mobile station apparatus 10 that has transmitted the maximum power transmission information which has been input from the maximum power transmission information receiver 24, the reception power being acquired by the reception power acquiring unit 22.

The transmission power controller 23 controls transmission power on the basis of the target reception power that has been changed in this manner. As a result, the reception power of the transmitter/receiver 21 for the mobile station apparatus 10 for which space division multiplex communication is performed becomes equal to the reception power of the transmitter/receiver 21 for the mobile station apparatus 10 that has transmitted the maximum power transmission information.

There may be a case in which, regarding the mobile station apparatus 10 in which the reception power of the transmitter/receiver 21 is on the verge of the upper limit of the reception power range, the reception power does not become equal even by such control. The reason for this is that, when the transmitter/receiver 11 is performing transmission at the minimum transmission power, the reception power of the transmitter/receiver 21 with regard to the mobile station apparatus 10 cannot be decreased further.

In order to cope with this, the base station apparatus 20 may handle, not as an apparatus for which space division multiplex is performed, a mobile station apparatus 10 whose reception power of the transmitter/receiver 21 is different from that of the other mobile station apparatuses 10 by predetermined value or more among the mobile station apparatuses 10 for which space division multiplex is performed.

Furthermore, the base station apparatus 20 may exclude, from an object for space division multiplex communication, a mobile station apparatus 10 in which the reception power of the transmitter/receiver 21 cannot be sufficiently decreased even by closed loop control after the target reception power is changed. As a result of the above, it is possible to more appropriately equalize the reception power of the transmitter/receiver 21 with regard to the mobile station apparatus 10 for which space division multiplex communication is performed.

The above-described processing will be described again in detail below with reference to the flowchart of the processing of the base station apparatus 20.

FIG. 4 is a flowchart of processing of the base station apparatus 20 before space division multiplex is performed.

At first, the base station apparatus 20, under closed loop control, performs transmission power control on the mobile station apparatus 10 during communication (S1). The target reception power at this time is a maximum value within the range of the reception power that is necessary and sufficient for the base station apparatus 20 to receive a signal when space division multiplex is performed.

Next, the base station apparatus 20 performs processing of S3 to S5 described below on all the mobile station apparatuses 10 during communication (S2, S6). In S3, it is determined whether or not the reception power from the i-th mobile station apparatus 10 is between a minimum threshold value and a maximum threshold value. The range indicated between the minimum threshold value and the maximum threshold value is the reception power range.

The base station apparatus 20 handles a mobile station apparatus 10 in which the reception power falls within this range as an apparatus for which space division multiplex is performed (S4).

On the other hand, the base station apparatus 20 does not handle a mobile station apparatus 10 in which the reception power does not fall within this range as an apparatus for which space division multiplex is performed (S5).

Furthermore, the base station apparatus 20 excludes, from the mobile station apparatuses 10 for which space division multiplex communication is performed, mobile station apparatuses 10 whose difference in reception power from the other mobile station apparatuses 10 is greater than or equal to a predetermined value among the mobile station apparatuses 10 that are made to be objects for space division multiplex (S7).

After the mobile station apparatuses 10 are classified into mobile station apparatuses 10 that are made to be objects for space division multiplex and mobile station apparatuses 10 that are not made to be objects for space division multiplex in the manner described above, the base station apparatus 20 performs space division multiplex (S8).

At this time, of course, there is a possibility that there are mobile station apparatuses 10 on which space division multiplex cannot be performed due to the reason that, for example, the mobile station apparatuses 10 are at almost the same position when viewed from the base station apparatus 20.

FIG. 5 shows a flowchart of processing of the base station apparatus 20 while space division multiplex is being performed.

At first, the base station apparatus 20 performs processing of S11 and S12 to be described below on the mobile station apparatus 10 that has been subjected to space division multiplex (S10, S13). For example, when space division multiplex is to be performed for each frequency, the base station apparatus 20 performs processing of S11 and S12 for each frequency. In S11, the base station apparatus 20 determines whether or not the reception power from the j-th mobile station apparatus 10 is between a minimum threshold value and a maximum threshold value. This range indicated between the minimum threshold value and the maximum threshold value is also the reception power range. The base station apparatus 20 releases a mobile station apparatus 10 in which the reception power does not fall within this range from an object for space division multiplex (S12).

Next, the base station apparatus 20 performs processing of S15 and S16 to be described below on the mobile station apparatus 10 that has been subjected to space division multiplex (S14, S17). In S14, the base station apparatus 20 acquires the mobile station apparatus 10 that is performing transmission at maximum transmission power. The base station apparatus 20 performs processing of S14 on the basis of the maximum power transmission information.

The base station apparatus 20 sets the target reception power to reception power for the mobile station apparatus 10 that is performing transmission at maximum power transmission (S16). When maximum power transmission information has been received from a plurality of mobile station apparatuses 10, it is preferable that the base station apparatus 20 set the minimum reception power to the target reception power.

The base station apparatus 20 performs closed loop control on the basis of the newly set target reception power or the original target reception power when the target reception power has not been newly set (S18).

As a result of the above, in the mobile communication system 1, it is possible to equalize reception powers of communication signals received from mobile station apparatuses 10 by the base station apparatus 20 while saving the wireless resources as much as possible.

The present invention is not limited to the above-described embodiment. Among the mobile station apparatuses 10, there is a mobile station apparatus 10 for which it is known in advance that transmission is performed at maximum transmission power (for example, an old-type mobile station apparatus 10 that can transmit at only the maximum value determined by the transmission power controller 12 as a result of the above processing). Regarding such a mobile station apparatus 10, the type information and the signal format of the mobile station apparatus 10, which are transmitted from the mobile station apparatus 10, become the maximum power transmission information.

The invention claimed is:

1. A base station apparatus configured to communicate with a plurality of mobile station apparatuses in a mobile communication system, wherein each of the mobile station apparatuses comprise a maximum power transmission information transmitting unit configured to transmit to the base station apparatus maximum power transmission information indicating that a communication signal is transmitted at the maximum transmission power of the mobile station apparatus, the base station comprising:
    a transmission power control unit configured to control a transmitting power of each of the mobile station apparatuses such that a reception power of a communication signal transmitted from each of the mobile station apparatuses and received by the base station apparatus is approximately equal to a target reception power;
    a reception power acquiring unit configured to acquire a reception power of the communication signal transmitted from each of the mobile station apparatuses;

a maximum power transmission information receiver configured to receive the maximum power transmission information from each of the mobile station apparatuses; and a target reception power changer configured to change the target reception power to a maximum reception power of a communication signal received from a mobile station apparatus which has transmitted the communication signal at a maximum transmission power level, wherein the transmission power control unit sends an instruction to at least one mobile station apparatus to control the at least one mobile station apparatus such that a reception power of a communication signal transmitted by the at least one mobile station apparatus is approximately equal to the changed target reception power.

2. The base station apparatus according to claim 1, wherein the transmission power control unit controls the transmitting power of each of the mobile station apparatuses such that a reception power of a communication signal transmitted from each of the mobile station apparatuses falls within a predetermined range of the target reception power, so as to perform space division multiplexing between the base station apparatus and the mobile station apparatuses that transmit communication signals having reception powers falling within the predetermined range of the target reception power.

3. The base station apparatus of claim 1 wherein if the reception power acquiring unit acquires a maximum reception power of communication signals transmitted from two or more mobile station apparatuses, the target reception power changer changes the target reception power to the maximum reception power having the lowest power level.

4. A method of controlling transmission power of a plurality of mobile stations configured to communicate with a base station in a mobile communication network, the method comprising:
   determining a reception power level of a communication signal transmitted from each of the mobile stations and received by the base station;
   receiving a maximum power transmission information signal from each of the mobile stations indicating whether each mobile station has transmitted a communication signal at a maximum power level;
   setting a target reception power level equal to a maximum power level of a first mobile station that has transmitted a communication signal at a maximum power level; and
   sending an instruction to each of mobile stations that have transmitted a communication signal at a maximum power level to control the mobile stations such that a reception power of a communication signal transmitted from the mobile stations is approximately equal to the target reception power.

5. The method of claim 1 wherein if a plurality of mobile stations have transmitted a communication signal at a maximum power level, the maximum power level of the first mobile station has a lowest power level among communication signals transmitted by the plurality of mobile stations.

* * * * *